United States Patent [19]
Everhardt et al.

[11] 3,925,005
[45] Dec. 9, 1975

[54] MODULAR CURING CHAMBER

[75] Inventors: William F. Everhardt; Henry L. Brown, Jr.; Clement O. Dennis, Sr., all of Macon, Ga.

[73] Assignee: American Power Tread Corporation, Macon, Ga.

[22] Filed: Oct. 4, 1974

[21] Appl. No.: 512,080

[52] U.S. Cl. ................. 432/82; 432/128; 432/145; 432/243
[51] Int. Cl.² ......................... F27B 9/02; F27B 9/12
[58] Field of Search ............. 432/82, 128, 144, 145, 432/243

[56] References Cited
UNITED STATES PATENTS

| | | |
|---|---|---|
| 1,028,043 | 5/1912 | Lunt et al. ........................... 432/243 |
| 1,674,407 | 6/1928 | Manker ............................... 432/243 |
| 2,086,971 | 7/1937 | Wilson et al. ....................... 432/243 |
| 2,100,222 | 11/1937 | McFarland ........................... 432/82 |
| 2,925,260 | 2/1960 | Dickey ................................. 432/82 |
| 3,063,878 | 11/1962 | Wilson ................................. 432/82 |
| 3,184,224 | 5/1965 | Shelley ................................. 432/82 |
| 3,669,426 | 6/1972 | Whitehouse ........................ 432/144 |

*Primary Examiner*—John J. Camby
*Attorney, Agent, or Firm*—Shlesinger, Arkwright, Garvey & Dinsmore

[57] ABSTRACT

A modular chamber for curing a heat curable adhesive and thereby bonding a prevulcanized tread strip to a tire carcass, the chamber comprising an entrance-exit module, an end module, and at least one intermediate module, the entrance-exit module including a partition wall dividing the module into entrance and exit sections, the intermediate module also including a partition wall for dividing the intermediate module into two portions. Conveying means is provided for transporting tires into the entrance section and through the remainder of the chamber in a U-shaped path. The air in the chamber is heated to approximately 300°F, and means is provided for circulating the air in the chamber about the tires for promoting curing of the adhesive.

7 Claims, 5 Drawing Figures

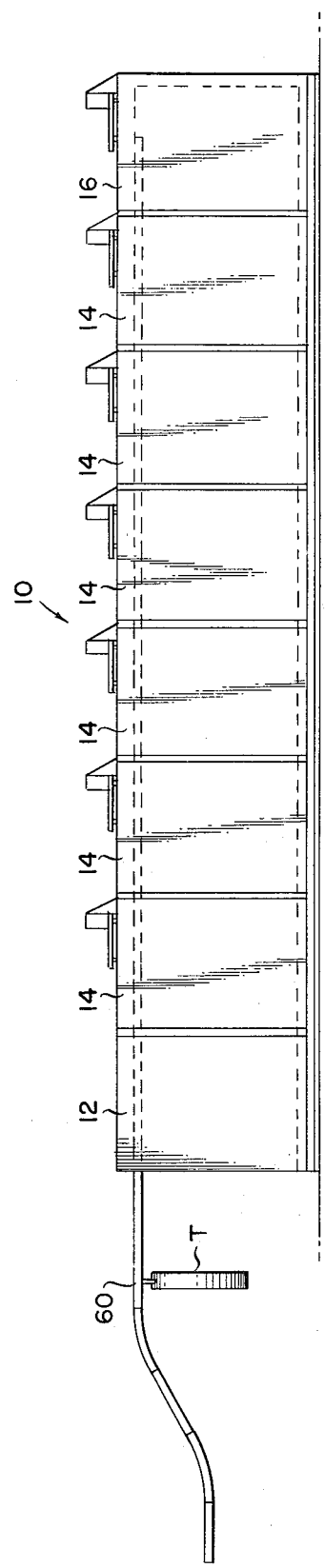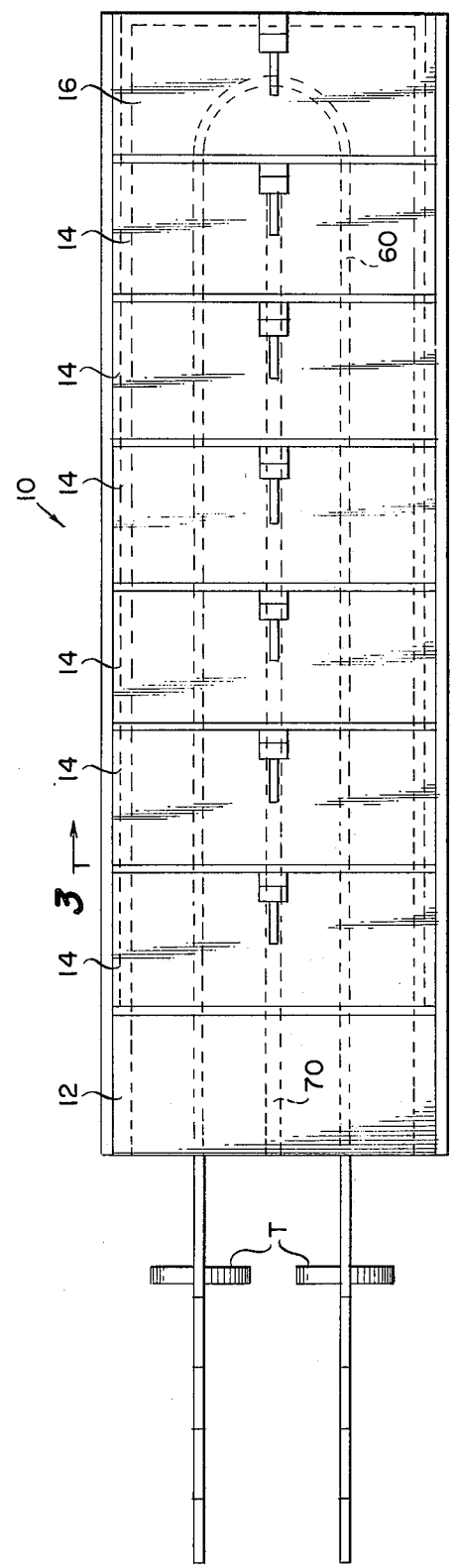

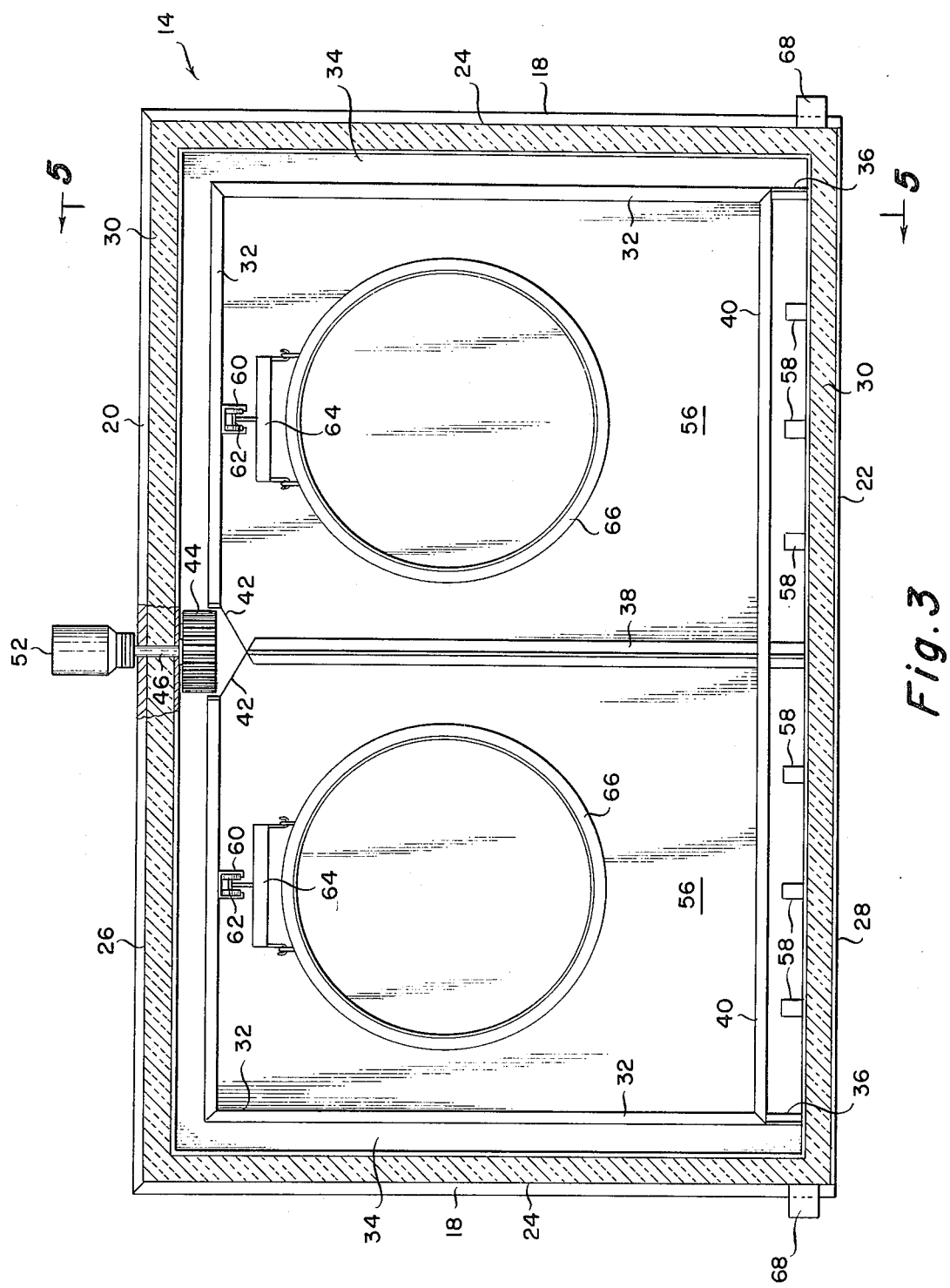

MODULAR CURING CHAMBER

This invention relates to an apparatus for use in retreading pneumatic tires. More particularly, this invention relates to an apparatus for use in retreading tires using the so-called cold vulcanization process.

BACKGROUND AND OBJECTS

In recent years the retreading of the running surface of pneumatic vehicle tires has involved a cold vulcanization process. In this process, a pre-vulcanized tread strip is used and is bonded to the tire casing being renewed by means of an adhesive which is curable at a relatively low temperature. Often, the adhesive is in the form of a thin strip of cushion gum which has adhesive on both sides thereof and bonds the prevulcanized tread strip to the tire carcass. The adhesive is typically a two component system, one of the components being present on the tire casing and the surface of the tread strip and the other component being present on both faces of the cushion gum strip.

When the pre-vulcanized tread strip is assembled on the tire carcass with the cushion gum layer therebetween, the two components of the adhesive system are brought into contact. The adhesive system is then cured, and usually the curing is accelerated by heat. However, the heat is relatively slight compared to hot vulcanization processes, and temperatures on the order of 300°F are used for cold vulcanizing. In addition to heat, pressure is applied so that the tread strip is pressed against the tire carcass, and the combination of the pressure and the heat promote the vulcanization reaction and thus the bonding of the tread strip to the tire carcass. Such a process provides an extremely good bond between the tread strip and the tire carcass, and because of considerably lower temperatures than in the hot vulcanization processes, savings in terms of energy requirements are realized. This cold vulcanizing process is described in U.S. Pat. No. 2,976,910, and an improvement in such process is described in copending application Ser. No. 512,088, filed Oct. 4, 1974, by William F. Everhardt and Henry L. Brown, Jr., and entitled *Method and Apparatus for Retreading Pneumatic Tires*.

Prior art apparatus for use in retreading running surface of vechicle tires using the cold vulcanization process have been limited to a batch-type apparatus wherein one or more tires being retreaded is placed within a heat and pressure chamber wherein the curing of the adhesive is effected. A batch type process is inherently slow and severely limits the number of tires which can be retreaded per day or alternatively, requires a substantial capital investment for a number of such curing vessels. This of necessity results in higher costs for retreading of tires at a time when the demand for retreaded tires is high. Vehicle tires are often retreaded as many as ten times before being discarded due to high amounts of wear in relatively short time periods. Retreading of tires is used in all phases of the vehicle industry including but not limited to the aircraft industry, trucking industry, farm implement industry, passenger vehicles, etc.

The present invention overcomes the aforementioned disadvantages of prior art apparatus by providing a continuous apparatus for curing of the adhesive used for retreading pneumatic tires. Additionally, the captial expenditure required for the apparatus of the present invention is comparatively small, and the apparatus is further capable of expansion to meet the needs of the retreader.

Accordingly, it is a primary object of the present invention to overcome the disadvantages of prior art retreading apparatus.

Another object of this invention is to provide an apparatus capable of continuously curing the adhesiive in cold vulcanization retreading.

Still a further object of this invention is to provide a modular chamber for curing an adhesive used in the retreading process.

Yet another object of this invention is to provide an apparatus which may be operated automatically for curing the retreading adhesive.

Yet a further object of this invention is to provide a modular heating chamber through which tires being cured are conveyed during the curing process.

A further object of this invention is to provide a modular curing chamber wherein the tires being retreaded are subjected to a highly uniform degree of heat over the entire tire assembly throughout the apparatus.

These and other objects and advantages of this invention will become apparent when considered in light of the following description and claims when taken together with the accompanying drawings, in which:

FIG. 1 is a side elevational view of the apparatus according to this invention;

FIG. 2 is a top plan view of the apparatus of FIG. 1;

FIG. 3 is a vertical sectional view of one of the modules according to this invention and taken along line 3—3 of FIG. 2 and viewed in the direction of the arrows;

DESCRIPTION OF THE INVENTION

Figure 5:
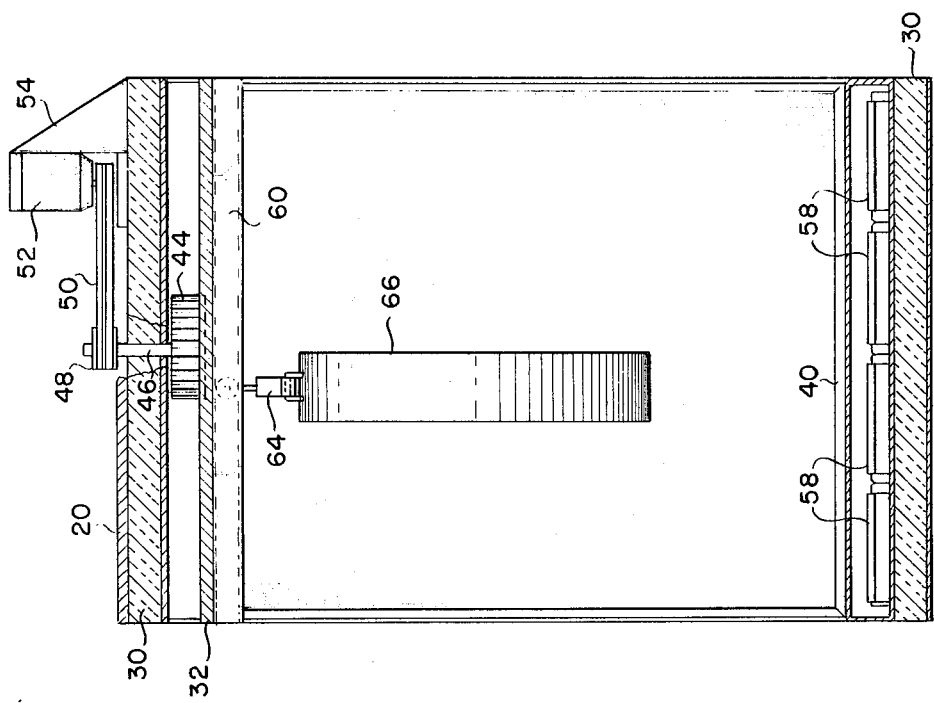
FIG. 5 is a sectional view taken along line 5—5 of FIG. 3 and viewed in the direction of the arrows.

Referring to FIGS. 1 and 2, the curing chamber 10 of this invention includes an entrance-exit module 12, a plurality of intermediate modules 14 and an end module 16. Any number of intermediate modules 14 may be utilized, but six such modules have been shown for purposes of illustration. The modules are joined together by any suitable means such as bolts (not shown).

Referring to FIG. 3, each of the intermediate modules 14 is seen to include vertical side frame members 18 and a horizontal top frame member 20, and a base 22. The walls 24, the roof 26, and the floor 28 of each of the modules is seen to be insulated as at 30. The module 14 is open at the front and back as seen in FIG. 3, and thus the interior of the module 14 is insulated on four sides. The other sides of the module 14 are in open communication with adjacent modules.

Within the intermediate modules 14 as well as the end module 16 are provided frame members 32 spaced from the insulation 30 so as to define ducts 34. The frame 32 is spaced from the bottom insulation by suitable supports 36. A partition wall 38 separates the intermediate modules 14 into two sections as clearly shown in FIG. 3. The two sections are not in direct communication with each other.

The floor panels 40 are foraminous for a purpose which will be described hereinafter.

Also, at the upper interior corner of each of the sections of the modules 14 are provided openings 42 which may be in the nature of foraminous screens, louvers, etc. Positioned immediately above the openings 42 and within the ducts 34 is a squirrel cage blower 44 mounted on a shaft 46. Shaft 46 is provided with pullies 48 which are driven by means of drive belts 50 by means of an electric motor 52 supported on the top of the intermediate module 14 by means of a mounting bracket 54. This arrangement of the blower allows air to be drawn upwardly through the two portions 56 and passed around the periphery of the module and then vertically upwardly through the foraminous floor member 40. This construction is similar in the end module 16, however, in the end module no partition wall is used.

A plurality of heating elements 58 are provided beneath the foraminous floor 40, and these heating elements are preferably high intensity quartz lamps. Preferably, three rows of four lamps each are evenly arranged over each portion 56 of the modules 14 and 16. In this manner, air is forced by means of the blower 48 over the lamps 58 which heat the air. The air then passes upwardly through the floor 40 and heats the interior of the module. The combination of the blower, the heating lamps, and the insulated module results in a very efficient heating system with a highly uniform degree of heat.

As indicated previously, the end module 16 while including the blower, ducting, and heating lamps as in the intermediate modules, includes no partition wall. On the other hand, a conveyor rail 60 extends through each portion 56 of each intermediate module 14 and makes a U-turn in end module 16 around the partition wall. In this manner, the length of the entire curing chamber is approximately one-half of the length of travel of the conveyor within the curing chamber resulting in a space saving.

The conveyor rail 60 is of any suitable construction and includes conveying elements 62 having brackets 64 depending therefrom. The brackets 64 are adapted to engage the pressure ring 66 encircling the tire being retreaded. Preferably, the conveyor rail 60 and the conveying elements 62 comprise an electrified tram rail type conveyor system.

The drive motor (not shown) for the conveyor means is a variable speed motor, so that the speed may be adjusted in accordance with the length of the conveyor rail within the chamber 10 so that the dwell time of a tire being retreaded within the chamber may be controlled.

Figure 4:
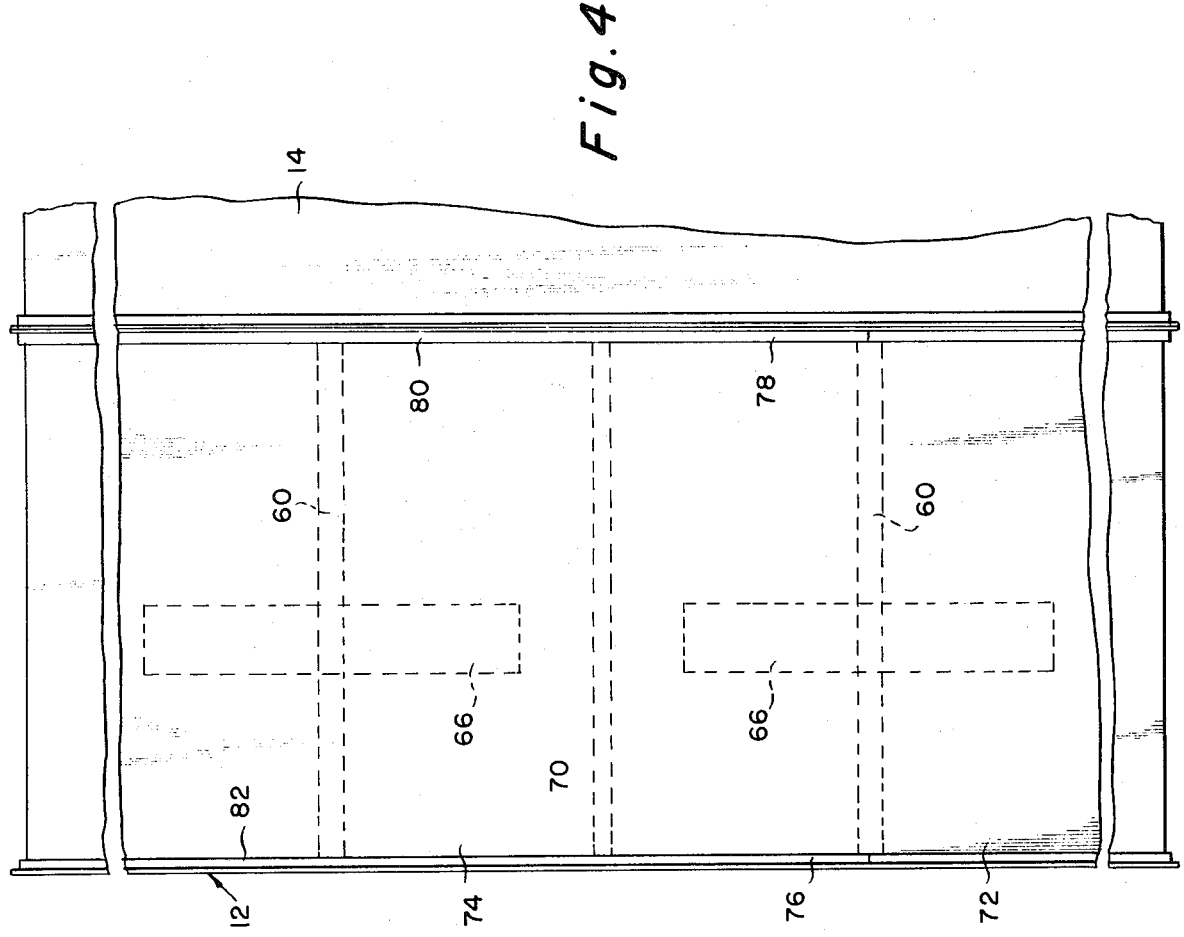
FIG. 4 is a top plan view of one of the modules of this invention.

The heating lamps 58 are also controlled electrically through a plurality of thermostats. The thermostats (not shown) are used to turn on as many of the lamps 58 as are needed to maintain the proper temperature within the modules. For wiring the heating lamps 58, the wires are passed through tubes within the insulation 30 and into wiring troughs 68 along the side walls of the modules. The entrance-exit module 12 as seen in FIG. 4 is similar in construction to the intermediate modules 14 and likewise includes a partition wall 70. However, no blower or heating element is provided within this module. The partition wall 70 divides the entrance-exit module 12 into an entrance portion 72 and an exit portion 74. Outer and inner entrance doors 76 and 78 are provided in the entrance portion 72. In this manner, the entrance portion 72 may be closed from the outside and from the remainder of the heating chamber. Similarly, inner and outer exit doors 80 and 82 are provided in the exit portion 74 of the module. The entrance and exit portion 72 and 74 thus serve as "air-locks" to prevent the loss of heat from the interior of the curing member.

In operation, a tire T which is being retreaded and which has the tread strip applied to the casing and which has been inserted within a pressure ring and inflated is suspended from one of the brackets 64. The outer entrance doors 76 are opened and the tire passes into the entrance portion 72 of the entrance-exit module 12. The residence time in the module is determined by the speed of the conveyor. At the appropriate time, the inner entrance doors 78 are opened, and the tire T passes along the conveyor rail 60 through the entire curing chamber. Before the tire is placed within the chamber, the electrical controls are operated to bring the temperature of the curing chamber up to the desired amount. Usually, the temperature is on the order of 300°F, but may vary slightly. Simultaneously with the energizing of the heater lamps 58, the blower 44 is started so that the air circulation within the modules is established.

As indicated previously, the speed of the conveyor will determine the residence time of the tire T in the curing chamber 10, and this residence time is determined in accordance with the number of modules in use. A plurality of tires may be cured simultaneously within the chamber, and the tires may be inserted immediately behind one another. As the tire pass into the entrance portion, they are preheated by the residual heat therein prior to passage into the first intermediate module 14. This preheating is achieved partially through heat escaping from the module 14 when the doors 78 are open and partially from emerging tires which are being cooled in the exit portion 74. Thus, a degree of heat exchange takes place between the entering and leaving tires since the partition wall is not insulated and will thus convect some heat.

Thus, it is seen that the number of tires which can be cured is now no longer determined in a batch-wise process, but may now be determined by the number of intermediate modules desired. Since the residence time for the curing of tires according to the cold vulcanization process is on the order of 2–5 hours, a large number of tires is capable of being retreaded within a given day using the apparatus of the instant invention.

While this invention has been described, it will be understood that it is capable of further modification, and this application is intended to cover any variations, uses and/or adaptions of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A modular chamber for curing a heat curable adhesive and thereby bonding a prevulcanized tread strip to a tire carcass, said chamber comprising:
   a. an entrance-exit module, and end module, and at least one intermediate module,
   b. said entrance-exit module including a partition wall dividing said module into entrance and exit portions,
   c. said at least one intermediate module including a partition wall dividing said intermediate module into two portions,
   d. means for conveying tires into said entrance portion around said partition wall and out of said exit portion in a U-shaped path,
e. panel members defining ducting around the outer walls of said intermediate and end modules,
f. a plurality of heating lamps positioned in said ducting along the bottom walls of said intermediate and end modules,
g. a blower positioned in said ducting along the top walls of each of said intermediate and end modules,
h. said blower drawing air over said heating lamps and up through said modules around the tires and forcing the air through said ducting around the outer walls of said modules in a cyclic path so as to provide even heating throughout said chamber and promote even curing of the heat curable adhesive in said chamber.

2. A chamber as in claim 1 and wherein:
the walls of said modules are insulated.

3. A chamber as in claim 1 and wherein:
said blower is positioned above said partition wall.

4. A chamber as in claim 1 and wherein:
said conveying means includes a conveyor rail suspended from the roof of said modules.

5. A chamber as in claim 4 and including:
means for suspending tires from said conveyor rail.

6. A chamber as in claim 1 wherein:
a. said entrance-exit module includes inner and outer entrance doors in said entrance section and exit doors in said exit section,
b. said inner and outer entrance doors providing a preheating chamber therebetween.

7. A chamber as in claim 1 and wherein:
said chamber includes a plurality of said intermediate modules.

* * * * *